L. Horn,
Screw for Piano-Stools,
Nº 44,423. Patented Sept. 27, 1864.

Witnesses.
La Fayette Peacy
Chas. H. Hersey

Inventor:
Lorenzo Horn

UNITED STATES PATENT OFFICE.

LORENZO HORN, OF WOLFBOROUGH, NEW HAMPSHIRE.

IMPROVED SCREW FOR MUSIC-STOOLS.

Specification forming part of Letters Patent No. 44,423, dated September 27, 1864.

*To all whom it may concern:*

Be it known that I, LORENZO HORN, of Wolfborough, in the county of Carroll and State of New Hampshire, have invented a new and useful Improvement in Screws for Music-Stools; and I do hereby declare that the following is a full, clear, and exact description of the construction and operation of the same, reference being had to the annexed drawings, making part of this specification, in which—

Figure 1:
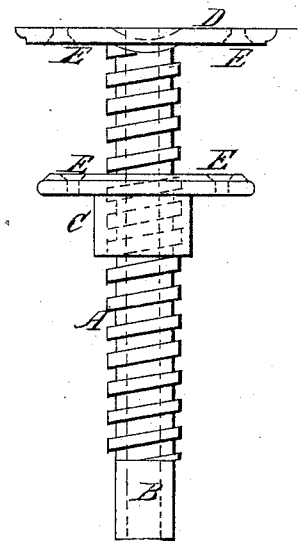
Figure 2:
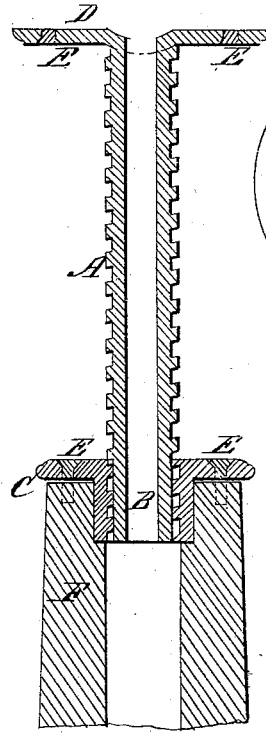
Figure 3:
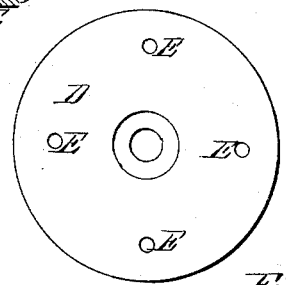
Figure 4:
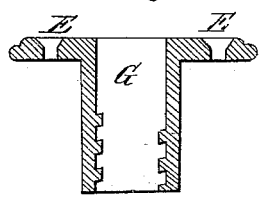
Figure 5:
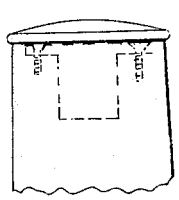

Figure 1 is an elevation view of the screw and nut. Fig. 2 is a longitudinal section showing the part or extension B resting in the nut; also showing a section of a portion of the pillar of a music-stool with the nut attached to it. Fig. 3 is a top view of the plate *d*. Fig. 4 is a section of a nut, a modification of the invention, where the improvement is in the nut instead of on the end of the screw. Fig. 5 is a view of the top part of the pillar of a music-stool as generally made.

Same letters indicate corresponding parts of the several figures.

A is a tube with a screw cut on its outside from the plate D at its top end to within a short distance of its lower end.

D is a circular plate with four screw holes, E, through it, by which to attach it to the seat of a music-stool. This plate, with the tube which constitutes the screw, are cast together in a single piece of malleable iron instead of being made of separate pieces, as heretofore done.

B is a portion of the tube which extends below the screw a distance equal to the length of nut C, and fits the hole in nut C, bearing against the inner edges of the thread, as seen in Fig. 2. This extension B is to prevent the screw from falling out of the nut by being screwed up too high, thus letting the seat fall to the floor, as is unavoidably the case with the screws in common use. This extension also answers as a guide to insure the entering of the screw accurately in the nut again.

C is a nut which fits the screw. This nut differs from those in general use in having the flange through which it is screwed to the pillar large enough in diameter to form the cap of the pillar, as in Fig. 2, instead of being let in, as seen by dotted lines, Fig. 5, and a cap of wood over it.

Fig. 4 is a modification of the improvement. This nut is double the length of the nut C, Figs. 1 and 2, and has a thread only in the lower half. The upper half, being without any thread, will fit the outside diameter of screw in Fig. 1. This nut can be used with the screws in common use, the upper half of the nut retaining the screw upright without falling out after the screw has been run up out of the thread in the lower half of the nut, thus accomplishing the object desired by the use of this nut, and with screws without the extension *b*, though it is cheaper to put the improvement onto the screw—viz., the extension B—than to accomplish the same object by the nut.

The object in making the screw tubular is to obtain greater strength from a given weight of metal, though it may be made solid as usual, if preferred.

Music-stools as usually made are very often seriously damaged by the seat falling to the floor in consequence of the screw being unconsciously run up out of the nut, especially by children, which is entirely obviated by my improvement.

What I claim as my invention, and desire to secure by Letters Patent, is—

Retaining the seat of a music-stool in its proper place after the screw has been run up out of the thread in the nut, substantially in the manner and for the purpose herein described and set forth.

LORENZO HORN.

Witnesses:
LA FAYETTE PEAVEY,
CHAS. H. HERSEY.